Dec. 19, 1944.　　L. W. YOUNG ET AL　　2,365,235
BLOWPIPE MACHINE
Filed Nov. 7, 1941　　2 Sheets-Sheet 1
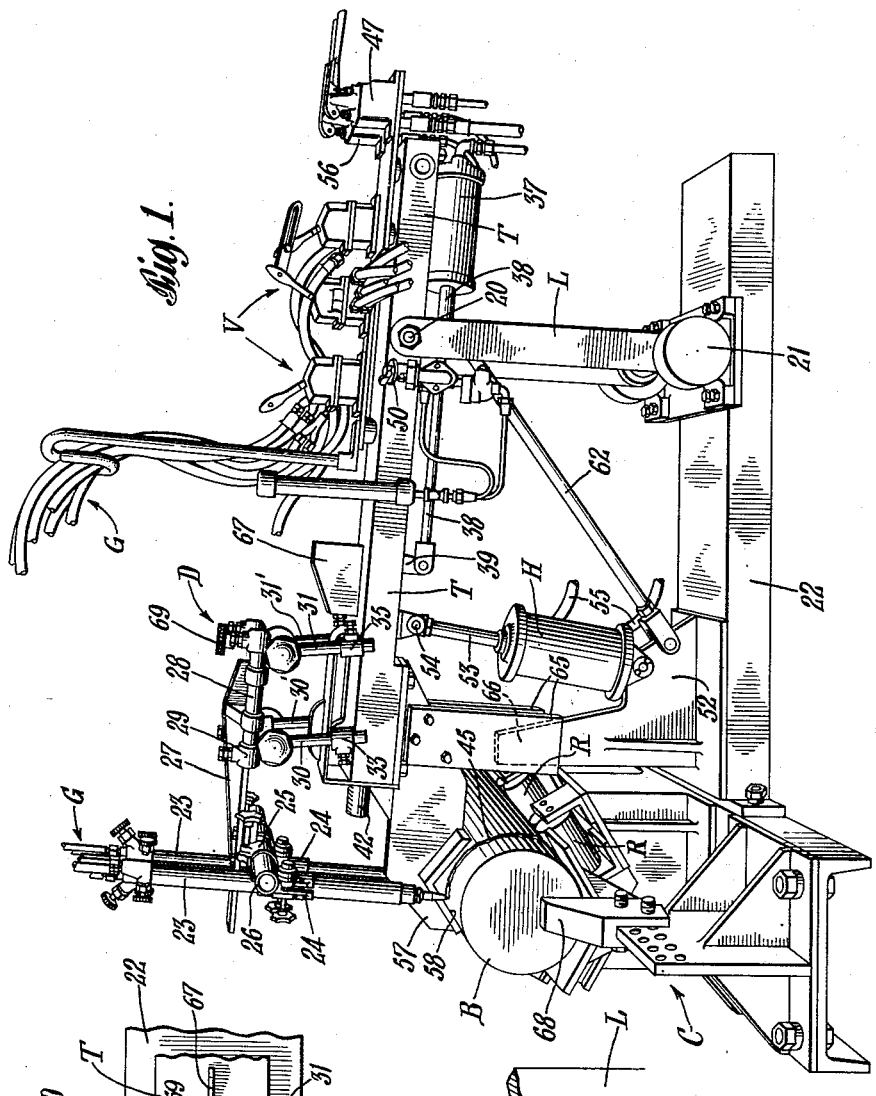
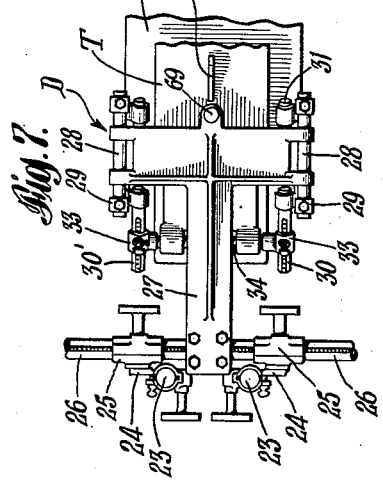
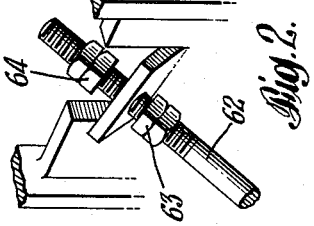
INVENTORS
LLOYD W. YOUNG
THOMAS S. JAMES
JOHN H. ROUNTREE
BY
ATTORNEY Dec. 19, 1944.  L. W. YOUNG ET AL  2,365,235
BLOWPIPE MACHINE
Filed Nov. 7, 1941  2 Sheets-Sheet 2
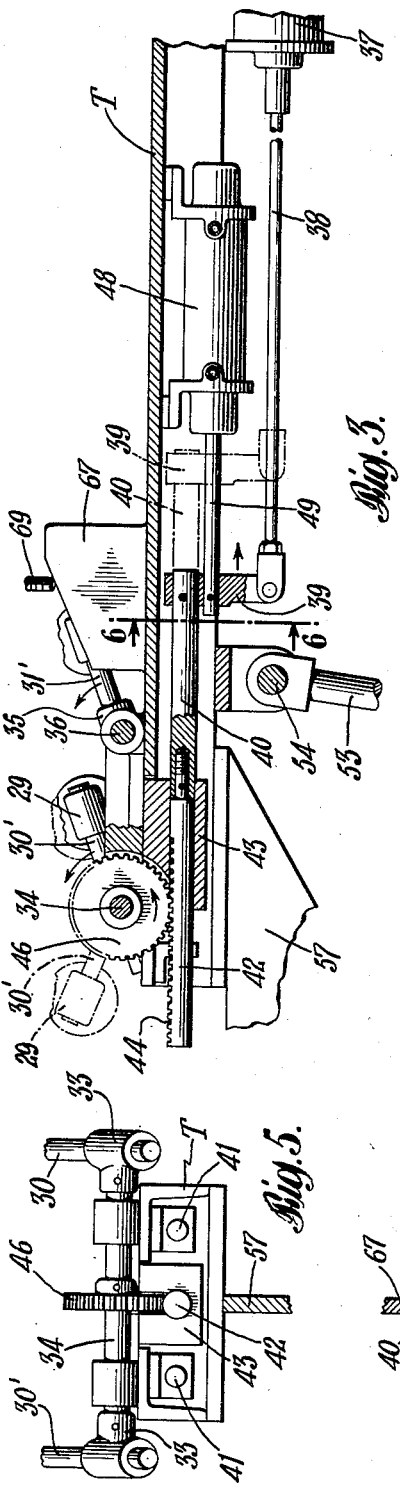
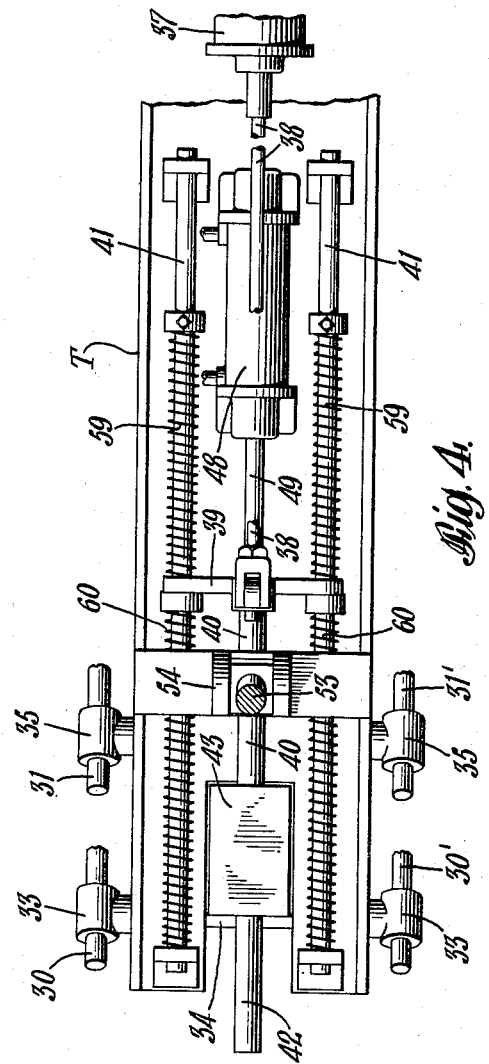
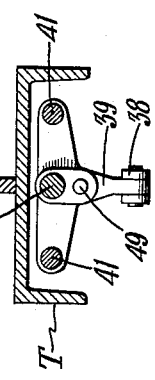
INVENTORS
LLOYD W. YOUNG
THOMAS S. JAMES
JOHN H. ROUNTREE
BY
ATTORNEY Patented Dec. 19, 1944

2,365,235

UNITED STATES PATENT OFFICE 2,365,235

BLOWPIPE MACHINE

Lloyd W. Young, Scotch Plains, N. J., Thomas S. James, Ben Avon, Pa., and John H. Rountree, Plainfield, N. J., assignors to The Linde Air Products Company, a corporation of Ohio Application November 7, 1941, Serial No. 418,224

9 Claims. (Cl. 266—23)

This invention relates to blowpipe machines, and more particularly to a machine for thermochemically cutting ferrous metal bodies such as steel bars and billets of various sizes.

Steel bars, billets, and the like have previously been cut by blowpipe or torch-translating machines which move an oxidizing gas jet discharged from a gas-cutting torch, transversely of the bar being cut at a suitable cutting speed to form thermochemically a kerf therethrough. Such bars, and billets are usually of various sizes according to the type or types of products the mill is rolling. Such prior art machines, however, are often specially constructed and arranged for cutting bars of a particular size. Such machines also cannot be withdrawn readily and efficiently to an inoperative position out of the way of other mechanisms and other bodies and, often, it has been necessary to provide a different machine for each commercial application.

It is the principal object of the present invention to provide an improved blowpipe-translating machine for thermochemically severing ferrous metal bodies such as steel bars, billets, and the like.

Other objects of this invention are to provide an improved blowpipe machine which may be installed adjacent a conveyor line which carries such bars and billets; to provide such a machine which includes an improved propelling mechanism for moving the blowpipe in a predetermined path substantially parallel to a work surface; to provide such a machine including an improved supporting means for supporting the blowpipe and such a blowpipe propelling mechanism or device; to provide such a machine which includes a blowpipe propelling device mounted on a supporting boom pivotally connected to a substantially vertical link member pivotally connected to a support; to provide such a machine including a blowpipe propelling device and supporting means so constructed and arranged as to permit the blowpipe device to be readily positioned in either an operative or inoperative position; to provide such a machine including power-actuated means for positioning the blowpipe device; to provide such a machine which is constructed and arranged to permit or to provide substantially horizontal movement of the blowpipe propelling device for positioning the device with respect to different sizes of bars and billets; to provide such a machine which is constructed and arranged so as to permit or to provide arcuate movement in a vertical transverse plane for moving the blowpipe propelling device toward or away from the workpiece; and to provide such a machine which is relatively simple and rugged in construction and economical to manufacture.

These and other objects and novel features will become apparent from the following description taken in connection with the accompanying drawings, in which:

Fig. 1 is a perspective view of a machine embodying the principles of the present invention;

Fig. 2 is a fragmentary, isometric view of a portion of the substantially vertical link of the machine of Fig. 1;

Fig. 3 is a fragmentary sectional view of a portion of the blowpipe propelling mechanism of the machine shown in Fig. 1;

Fig. 4 is a fragmentary bottom view of the propelling mechanism shown in Fig. 3;

Fig. 5 is an end view of the mechanism shown in Fig. 3;

Fig. 6 is a sectional view taken along line 6—6 of Fig. 3; and,

Fig. 7 is a fragmentary plan view of the outer end of the boom and the torch propelling device of the machine of Fig. 1.

Referring to the drawings which show a torch-propelling machine embodying the principles of the present invention, the workpiece, such as a round bar B, may be supported by any suitable means or may be supported by and movable along a conventional type of conveyor, such as a roll table C which includes a plurality of rollers R along which the bar B can be moved into position for cutting. All or part of the rollers R may be driven by a motor (not shown) for moving the bar into position or the bar B may be moved into position by an external pusher or the bar may be manually moved along the rollers R into position. The cutting machine includes a torch propelling device D for propelling one or more torches through a predetermined arcuate path across and substantially parallel to the surface of the bar. The device D is supported by a forward end of a transverse boom T which is pivotally connected at 20 to a link L which is in turn pivotally mounted in bearings 21 on the supporting base 22. The boom T is raised and lowered by a hydraulic or pneumatic cylinder H to move the device D upwardly and rearwardly away from the bar B to an inoperative position and to move the device toward the bar B to an operative position.

Each cutting torch 23 is vertically adjustably mounted in a holder 24 which is in turn pivotally connected to a bracket 25 longitudinally adjustable along a relatively long tube 26. The tube 26 is mounted on the outer end of an arm 27.

Each of the torches 23 can be independently vertically adjusted and can be independently horizontally adjusted along the tube 26 in a direction substantially parallel to the longitudinal axis of the bar B and can be tilted about the axis of the pivot connection between the holder 24 and bracket 25 for making bevel cuts.

The torch supporting arm 27 has mounted thereon two similar rods 28 on each of which there is mounted a pair of similar brackets 29. The brackets 29 on the front rod 28 are pivotally connected to the outer ends of links 30 and 31 and the brackets 29 mounted on the other rod 28 are pivotally connected to the outer ends of links 30' and 31'. Each of the links 30 and 30' is adjustably mounted in a sleeve 33 connected to a shaft 34 which is rotatably mounted on the boom T. Each of the links 31 and 31' is adjustably mounted in a sleeve 35 connected to the shaft 36 which is rotatably mounted on the boom T. When the shaft 34 is turned, all of the links are swung through an arc and the lower or nozzle ends of torches 23 are moved through an arc of substantially the same radius as the radius of the bar B. The length of the links can be readily adjusted in equal amounts to vary the radius of the arc through which the torches 23 are moved in accordance with the size of the bar to be severed.

On the underside of boom T, there is mounted a hydraulic or pneumatic, torch propelling cylinder 37 having a piston rod 38 connected to a downwardly extending portion of a slide 39 fastened to a rod 40 (Fig. 3), and slidingly mounted on a pair of rods 41. The rod 40 is connected to a second rod 42 which is horizontally slidably mounted in a guide member 43 on the boom T. The rod 42 has rack teeth 44 formed therein and adapted to mesh with a spur gear 46 mounted on the shaft 34. A manually operable valve 47 is provided on the boom T for controlling the flow of gas or fluid to the cylinder 37.

When gas or fluid is admitted to the rod end of cylinder 37, the rod 42 is moved toward the right and the spur gear 46 is rotated to move the torches 23 in an anti-clockwise direction across the bar B to sever it by thermochemically forming one or more kerfs 45 therethrough. The blowpipes 23 can make a cut when moved either in the clockwise or anti-clockwise direction across the bar B but cuts are normally made by moving the blowpipes in an anti-clockwise direction. In Fig. 1, the torches 23 are substantially midway of a cut and are being moved in an anti-clockwise direction. To move the blowpipes 23 back across the bar in a clockwise direction, the valve 47 is actuated to admit gas or fluid under pressure to the head end of cylinder 37.

The blowpipe supporting and propelling device herein described is similar to the blowpipe supporting and propelling means shown and described in United States Letters Patent No. 2,283,345 issued May 19, 1942 to L. W. Young and United States Letters Patent No. 2,283,346 issued May 19, 1942 to J. H. Bucknam and L. W. Young.

Means are provided for retarding and controlling the rate of movement of the blowpipes 23 during the cutting operation. Beneath the boom T there is mounted a suitable dashpot such as a cylinder 48 containing a piston and having a piston rod 49 connected to slide 39. Fluid connections are provided at opposite ends of cylinder 48 and these ends may be connected by suitable lengths of tubing with an adjustable flow control or metering valve 50 (Fig. 1) interposed therebetween for controlling the rate of flow of fluid from the head end to the rod end of cylinder 48. Thus, the blowpipes are moved at a predetermined speed during the cutting operation. The metering valve 50 can be manually adjusted for different sizes of bars and may be adjusted during the cutting operation to vary the blowpipe speed. The valve 50 may include a by-pass and a check valve so that on the return stroke, the metering valve is ineffective and the fluid can flow substantially freely from the rod end to the head end of cylinder 48. Some restriction of flow is preferably provided on the return stroke so that the blowpipes are not returned so rapidly that they are damaged.

The pneumatic or hydraulic cylinder H is pivotally connected to a pedestal 52 on the base 22 and has a piston rod 53 connected at 54 to the boom T. The cylinder H is provided with gas or fluid connections which communicate through suitable lengths of hose 55 with a valve 56 which is connected to a source of supply of gas or fluid under pressure. To raise the boom T the valve 56 is actuated to admit gas or fluid under pressure to the head end of cylinder H. To lower the boom T, the pressure is relieved in the head end of cylinder H and gravity tends to lower the boom.

On the outer end of boom T, there is fastened an arm 57 having a V-shaped notch 58 formed therein that engages the upper surface of the bar B. The notch 58 centers or transversely positions the boom T and the torches 23 relative to the bar, and gas or fluid under pressure is preferably admitted to the rod end of cylinder H to force or urge the notched arm 57 into the central position and to hold the boom in position on the bar B.

Oppositely disposed springs 59 and 60 are provided on the rods 41 and on opposite sides of the slide 39. During the first half of the cutting stroke the weight of the links 30, 30' and 31, 31' and the torches 23 tends to retard the rate of torch movement and the compressed springs 60 are effective during the first part of the cutting stroke to aid in propelling or lifting the torches or blowpipes. The springs 59 are effective only during the last part of the stroke in slowing the speed of the torches and tend to counteract the speeding up effect of gravity. Thus, the blowpipes are propelled at substantially the same speed during the last half of the cut as during the first half of the cut.

The cylinder H is slightly inclined rearwardly and when gas or fluid is admitted to the head end of this cylinder, the outer or torch end of boom T is urged upwardly and rearwardly. A tie-rod 62 is pivotally connected to the pedestal 52 and the outer threaded end of rod 62 extends through the web of link L, as shown more particularly in Fig. 2. Two spaced nuts 63 and 64 are provided on the outer end of rod 62 and are positioned on opposite sides of the link L to limit its forward and rearward arcuate movement about the axis of bearings 21. The forwardly and rearwardly movable link L permits transverse positioning of the boom and the torches according to the size of the work and according to the transverse position of the work. When the boom T is moved downward so that the arm 57 engages the bar B, gas or fluid under pressure is preferably admitted to the rod end of cylinder H by means of valve 56 to aid in correctly positioning or centering the notched portion of arm 57 on the bar.

Suitable valves V are provided for controlling the flow of the preheating gases and a cutting gas from sources of supply through the hose G to the cutting torches 23. A downwardly extending pair of arms 65 are fastened to the boom T. These arms 65 are disposed on opposite sides of an upwardly extending leg 66 of pedestal 52 to prevent lateral movement of boom T.

If the bar to be cut is of a different diameter than the previous bar, the metering valve 50 must be manually adjusted and the links 30, 30' and 31, 31' must be similarly adjusted in the sleeves 33 and 35 to increase or decrease their effective length in accordance with the size of the bar. Normally, the effective length of the links is substantially equal to but slightly greater than the radius of the bar to be cut. The effective length of the links is such that the torches 23 are moved through arcs of substantially the same radius as the bar to be cut. Preferably the torches 23 are spaced a small amount from the surface of the bar during the cutting operation.

When in the operative position, the boom T is supported by the link L and the bar B. When a cut is not being made, the boom T and device D are normally swung upward away from the conveyor C to an inoperative position and the cutting torches are in the retracted position. When the boom T is in the retracted position, it is supported by link L and cylinder H. When the blowpipes are in the retracted position, the arm 27 may be supported by a stop 67. An adjustable bolt 69 may be provided on arm 27 for adjusting the limit of movement. An adjustable block 68 may be employed as an aid in correctly positioning a bar, such as the bar B, on the conveyor C. After the bar B has been moved into position, and device D has been adjusted, if necessary, to cut a bar of such a size, the operator actuates valve 56 to swing the boom T downward toward the bar B and to urge the boom T against the bar B. The combustible, mixed preheat gases are then turned on and ignited and after a short pause to heat a starting zone to the ignition temperature, the cutting gas, such as oxygen, for torches 23 is turned on and simultaneously the control valve 47 is actuated to admit gas or fluid under pressure to the head end of cylinder 37 to move the torches across the bar. The preheating flames may be partially or entirely eliminated, especially when cutting hot bars, but normally they are employed to start the cut or cuts and as an aid to increase the efficiency of the cutting operation. After the cutting operation is completed, the gases to the torches are turned off and the valve 47 may be actuated to retract the torches to the starting position. Valve 56 is next actuated to lift the outer end of boom T away from and free of the bar B. If additional cuts are to be made in the bar B, it can be repositioned on the conveyor or another bar can be moved into position and the cutting operation repeated.

Having described the invention in detail, it is obvious that alterations can be made in the apparatus shown and that some features can be used without others without departing from the spirit or scope of the invention. For instance a different device could be used for propelling the torch across the bar and one or more torches may be used simultaneously. Other sizes and shapes of bars could be severed and the blowpipe propelling device could be modified as shown and described in the previously referred to, United States Letters Patent Nos. 2,283,345 and 2,283,346 for severing rectangular bars. Other types of torches or blowpipes could be propelled across such a bar for welding, hardening, or heat-treating the bar. The machine could be so adapted that the boom could be moved in a horizontal plane for cutting a vertical bar.

We claim:

1. A machine for moving a blowpipe across a body when supported in position for treatment and comprising, in combination, a link; a transverse boom pivotally connected to said link and extending forwardly toward said body for supporting a blowpipe mechanism on its forward end adjacent said body, said boom being movable in an arc about the axis of its pivotal connection; a relatively fixed support to which said link is pivotally connected, for forward and rearward movement of said link and said boom toward and away from said body; mechanism on said boom for propelling the blowpipe across said body; and power-actuated means connected to said boom and operable to move said boom about both pivotal connections whereby the forward end of said boom is moved toward and away from an operative position adjacent said body.

2. A blowpipe machine as claimed in claim 1 which includes means for limiting the forward and rearward movement of said link about the pivotal connection between said boom and said support.

3. A blowpipe machine as claimed in claim 1 in which the body has an arcuate surface and in which said mechanism is constructed and arranged to move the blowpipe through an arc across and substantially parallel to said arcuate surface and includes means substantially compensating for the effect of gravity on said blowpipe mechanism whereby the arcuate speed of the blowpipe during each half of the cut is substantially the same.

4. A machine for moving a blowpipe in a perpendicular plane across a body when supported in a substantially horizontal position and comprising, in combination, a support adjacent said body; a substantially vertical link pivotally connected at its lower end portion to said support; a transverse boom pivotally connected to the upper end portion of said link and extending substantially horizontally toward said body when in the operative position, said boom and said link being so constructed and arranged that the pivotal axes of said pivot connections are parallel to each other and are perpendicular to said plane of blowpipe movement whereby said boom is both substantially transversely horizontally movable and movable through an arcuate path in a plane parallel to said plane of blowpipe movement; mechanism on said boom for propelling the blowpipe in said perpendicular plane across said body; and power-actuated means associated with said boom and operable to move said boom about said pivot connections, said last mentioned means including a generally vertically disposed fluid-actuated piston and cooperating cylinder connected to said boom for applying upwardly directed forces thereto.

5. A blowpipe machine as claimed in claim 4 which includes means including a contact element for preventing lateral movement of said boom whereby said boom is maintained in a plane parallel to said plane of blowpipe movement.

6. In a blowpipe machine, a blowpipe; power-actuated mechanism for supporting and propelling said blowpipe in a path across and substantially parallel to an arcuate surface of a horizontal metal body, such as a round bar; spring means for aiding said power-actuated mechanism in lifting and propelling said blowpipe through the rising portion of said path; and a second compensating spring means for retarding said power-actuated mechanism in lowering and propelling said blowpipe through the lowering portion of said path, both of said spring means at least partially compensating for the effect of gravity.

7. Blowpipe apparatus for moving a blowpipe across a body comprising, in combination, means for supporting said body; a blowpipe; a link; a transverse boom pivotally connected adjacent its rearward end and extending forwardly toward said body and adapted to support said blowpipe on its forward end adjacent said body, said boom being movable about said pivot connection whereby said forward blowpipe-supporting end is swingable toward and away from said body; a support adjacent said body supporting means, said link being pivotally connected to said support for forward and rearward movement of said boom and said link; power-actuated means connected to said boom and operable to move and urge said boom about both of said pivotal connections whereby said blowpipe is swung toward and away from said body and is moved forwardly and rearwardly toward and away from said body; and means adapted to engage said body as said blowpipe is swung toward said body for positioning the forward end of said boom in accurate alignment with said body when said forward end is urged into an operative position adjacent said body.

8. A machine for moving a cutting torch across any one of a plurality of sizes of ferrous metal bodies, such as round steel bars or billets, to thermochemically form a kerf therethrough, such machine comprising, in combination, a support adjacent such a bar; a link pivotally connected to said support for movement through an arc about such connection; a boom pivotally connected to said link for movement through an arc about the connection between said boom and said link, said boom extending toward said bar and having an end portion adapted to engage said bar; a device on said boom for propelling a cutting blowpipe through a predetermined path substantially parallel to the surface of said bar; a member connected to said link and adapted to limit the arcuate movement of said link; a fluid-operated cylinder connected to said boom to move said boom about its pivot connection to said link and about the pivot connection of said link to said support for moving the blowpipe to an operative position adjacent said bar and to an inoperative position spaced from said bar.

9. A machine for supporting and propelling a blowpipe device across a metal body, which comprises the combination of a base adapted to be mounted adjacent one side of said body; an elongated boom extending transversely of said body; connective means connecting said base and one end portion of said boom so that a free end portion thereof can be moved longitudinally forwardly or rearwardly and swung upwardly or downwardly in an arcuate path; a blowpipe; blowpipe mechanism for supporting and propelling said blowpipe carried by said boom adjacent said free end portion; support means associated with the boom for supporting said boom and for positioning said blowpipe means relative to said body, said boom support means being adapted to support the boom in a relatively fixed position during the propulsion of said blowpipe; and power-actuated means directly connected to said boom and operable to move the same forwardly and downwardly or rearwardly and upwardly; all of said parts being so arranged that the free end portion of said boom and said blowpipe mechanism can be moved forwardly and downwardly into operative position adjacent said body or rearwardly and upwardly into inoperative position substantially spaced away from said body.

LLOYD W. YOUNG.
THOMAS S. JAMES.
JOHN H. ROUNTREE.